(12) United States Patent
Carmen, Jr. et al.

(10) Patent No.: US 7,737,653 B2
(45) Date of Patent: Jun. 15, 2010

(54) METHOD OF CONTROLLING A MOTORIZED WINDOW TREATMENT

(75) Inventors: Lawrence R. Carmen, Jr., Bath, PA (US); Robert Thomas Nachtrieb, Lansdale, PA (US); Thomas Warren Brenner, Wescosville, PA (US); Stephen Lundy, Allentown, PA (US); Jonathan H. Ference, Fleetwood, PA (US); Justin Mierta, Allentown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 295 days.

(21) Appl. No.: 11/787,723

(22) Filed: Apr. 17, 2007

(65) Prior Publication Data

US 2008/0258666 A1 Oct. 23, 2008

(51) Int. Cl.
*G05D 3/00* (2006.01)
*G05B 9/02* (2006.01)
*A47G 5/02* (2006.01)

(52) U.S. Cl. .................. 318/466; 318/469; 318/256; 318/283; 318/563; 318/565; 318/383; 318/434; 160/309; 160/310; 160/238; 160/331

(58) Field of Classification Search ................ 318/466
See application file for complete search history.

(56) References Cited

U.S. PATENT DOCUMENTS

| | | | |
|---|---|---|---|
| 4,873,453 A | 10/1989 | Schmerda et al. | |
| 4,881,020 A * | 11/1989 | Hida et al. | 318/626 |
| 5,038,272 A * | 8/1991 | Calcagno et al. | 700/64 |
| 5,467,266 A | 11/1995 | Jacobs et al. | |
| 5,760,556 A * | 6/1998 | Hamilton et al. | 318/438 |

(Continued)

FOREIGN PATENT DOCUMENTS

JP 05-25982 A 2/1993

(Continued)

OTHER PUBLICATIONS

European Patent Office, International Search Report and Written Opinion for International Patent Application No. PCT/US2008/060407, Jul. 31, 2008, 8 pages.

(Continued)

*Primary Examiner*—Jeffrey Donels
*Assistant Examiner*—Christopher Uhlir
(74) *Attorney, Agent, or Firm*—Mark E. Rose; Philip N. Smith

(57) ABSTRACT

A method of controlling a motorized window treatment provides for continued operation of the motorized window treatment during an overload condition, a low-line condition, or an electrostatic discharge (ESD) event. The motorized window treatment is driven by an electronic drive unit having a motor, a motor drive circuit, a rotational position sensor, a controller, and a memory for storing the command. The controller stores the present position of the motorized window treatment in the memory each time the rotational position of the motor changes by a predetermined angle, such that a plurality of positions are stored in the memory. When the controller is reset due to an overload condition or ESD event, the controller recalls the desired position from the memory, determines the present position, and continues to drive the motor drive circuit in response to the command and the present position.

19 Claims, 12 Drawing Sheets

U.S. PATENT DOCUMENTS

| | | |
|---|---|---|
| 6,069,428 A | 5/2000 | Nelson |
| 6,100,659 A | 8/2000 | Will et al. |
| 6,201,364 B1 | 3/2001 | Will et al. |
| 6,283,190 B1 * | 9/2001 | Hu et al. .................. 160/84.02 |
| 6,392,374 B1 | 5/2002 | Menetrier et al. |
| 6,465,980 B1 | 10/2002 | Orsat |
| 6,497,267 B1 | 12/2002 | Azar et al. |
| 6,972,538 B2 | 12/2005 | Dupielet et al. |
| 6,983,783 B2 | 1/2006 | Carmen, Jr. et al. |
| 7,281,565 B2 | 10/2007 | Carmen, Jr. et al. |
| 2003/0030950 A1 | 2/2003 | Bruno |
| 2003/0205978 A1 | 11/2003 | Lee |
| 2004/0100216 A1 | 5/2004 | Makaran et al. |
| 2006/0232233 A1 | 10/2006 | Adams et al. |
| 2006/0232234 A1 | 10/2006 | Newman, Jr. |
| 2008/0260363 A1 | 10/2008 | Carmen et al. |

FOREIGN PATENT DOCUMENTS

| | | |
|---|---|---|
| JP | 2003 301679 A | 10/2003 |

OTHER PUBLICATIONS

U.S. Appl. No. 12/098,088, filed Apr. 4, 2008, Carmen, Jr. et al.

European Patent Office, International Search Report and Written Opinion for International Patent Application No. PCT/US2008/060448, Aug. 19, 2008, 16 pages.

* cited by examiner

METHOD OF CONTROLLING A MOTORIZED WINDOW TREATMENT

BACKGROUND OF THE INVENTION

1. Field of the Invention

The present invention relates to a method of controlling a motorized window treatment, and more specifically, a method of controlling a motorized roller shade through a disruptive event, such as a motor overload condition, a low-line condition, or an electrostatic discharge event, which may cause a controller controlling the movement of the motorized roller shade to reset.

2. Description of the Related Art

Motorized window treatments typically include a flexible fabric or other means for covering a window in order to block or limit the daylight entering a space and to provide privacy. The motorized window treatments may comprise roller shades, Roman shades, or draperies. The motorized window treatments include a motor drive for movement of the fabric in front of the window to control the amount of the window that is covered by the fabric. For example, a motorized roller shade includes a flexible shade fabric wound onto an elongated roller tube with an electronic drive unit installed in the roller tube. The electronic drive unit includes a motor, such as a direct-current (DC) motor, which is operable to rotate the roller tube upon being energized by a DC voltage.

In order to provide for advanced control of the roller shade, the electronic drive unit preferably comprises a microprocessor or other processing means. The microprocessor is operable to control the rotational speed of the roller tube, to store a fully open position (i.e., an open limit) and a fully closed position (i.e., a closed limit), and to recall a preset position of the shade fabric. The microprocessor keeps track of the position of the shade fabric by counting the rotations of the motor and determines when the shade fabric has moved to a desired position. The microprocessor preferably receives power from a DC voltage supplied by an internal power supply in the electronic drive unit.

Motor overload conditions, low-line conditions, and electrostatic discharge (ESD) events may cause the DC voltage of the internal power supply of the electronic drive unit to drop below the voltage level required by the microprocessor to remain operational, and thus, may cause the microprocessor to reset. For example, the motor may suddenly draw a large amount of current if the electronic drive unit is driving the motor, but the shade fabric is unexpectedly prevented from moving. A transitory large current drawn from the power supply of the electronic drive unit may cause the DC voltage to drop below the regulated level and thus cause the microprocessor to reset. As used herein, an overload condition of a motor is defined as an event that causes the motor to suddenly draw a much larger amount of current. A motor may draw, for example, approximately 800 mA to 1.5 A during normal operation, and approximately 2 A to 10 A during an overload condition.

Further, the shade fabric of roller shades may accumulate electrical charge during movement. The electric charge on the shade fabric may be accidentally connected to the microprocessor and other control circuitry of the electronic drive unit, i.e., an ESD event, which may cause the microprocessor to reset. Also, if the voltage received by the internal power supply drops below the required input voltage of the power supply (i.e., the drop-out voltage), the DC voltage supplied by the internal power supply may drop below the regulated level.

If the microprocessor resets during movement of the roller shade, the position information maintained by the microprocessor may become inaccurate, which could also prevent the microprocessor from moving the shade fabric. Thus, there is a need for a method of controlling a motorized window treatment, in which the microprocessor is operable to control the motorized window treatment with minimal interruption of the movement of the window treatment fabric or loss of the desired final position of the window treatment fabric in the occurrence of an overload condition, a low-line condition, or an ESD event.

SUMMARY OF THE INVENTION

The present invention provides a method of controlling a motorized window treatment in response to a command. The motorized window treatment is driven by an electronic drive unit having a motor, a controller, and a memory. The controller is operable to determine the rotational position of the motor. The method comprises the steps of: (1) storing the command in the memory; (2) storing a present position of the motorized window treatment in the memory when the rotational position of the motor has changed by a predetermined angle; (3) recalling the command and the present position from the memory when the controller is reset; and (4) automatically driving the motor in response to the command and the present position after the command and present position have been recalled from the memory.

According to another embodiment of the present invention, a method of controlling a motorized window treatment to a desired position comprises the steps of: (1) storing the desired position in the memory; (2) storing a present position of the motorized window treatment in the memory when a rotational position of the motor has change by a predetermined angle; (3) recalling the desired position and the present position from the memory when the controller is reset; and (4) automatically driving the motor in response to the desired position and the present position after the command and present position have been recalled from the memory.

The present invention further provides an electronic drive unit for controlling a motorized window treatment. The electronic drive unit comprises a motor coupled to the motorized window treatment for moving the motorized window treatment, a rotational position sensor coupled to the motor, a motor drive circuit coupled to the motor, a controller coupled to the rotational position sensor and the motor drive circuit, and a memory coupled to the controller. The controller is operable to drive the motor drive circuit so as to control the rotation of the motor to control the motorized window treatment to a desired position. The controller is operable to determine a rotational position of the motor from the rotational position sensor. The controller is operable to store the desired position in the memory and to store a present position of the motorized window treatment in the memory in response to determining that the rotational position of the motor has changed by a predetermined angle. The controller is operable to recall the desired position and the present position from the memory after the controller is reset, and to automatically drive the motor drive circuit in response to the desired position and the present position after the command and present position have been recalled from the memory.

In addition, the present invention provides a method of controlling a motorized window treatment through an overload condition in which a motor of the motorized window treatment draws substantially large amount of current of transitory duration. The method comprises the steps of: (1) saving a desired position and a present position of the motorized window treatment prior to the overload condition; (2) allowing a controller of the motorized window treatment to reset during the overload condition; (3) recalling the desired position and the present position after the overload condition; and (4) automatically driving the motor of the motorized window treatment in response to the desired position and the present position after the desired position and the present position have been recalled.

According to another aspect of the present invention, a method of controlling a motorized window treatment is provided. The motorized window treatment is driven by an electronic drive unit having a motor, a memory, and a controller operable to determine the rotational position of the motor. The method comprises the steps of: (1) adjusting a present position of the motorized window treatment in response to the rotational position of the motor; and (2) storing the present position of the motorized window treatment in the memory each time the rotational position of the motor changes by the predetermined angle, such that a plurality of positions are stored in the memory in sequential order. The method further comprises the steps of: (3) locating a discontinuity in the plurality of position values; and (4) determining the present position of the motorized window treatment in response to locating the discontinuity in the plurality of position values.

Other features and advantages of the present invention will become apparent from the following description of the invention that refers to the accompanying drawings.

DETAILED DESCRIPTION OF THE INVENTION

Figure 1:
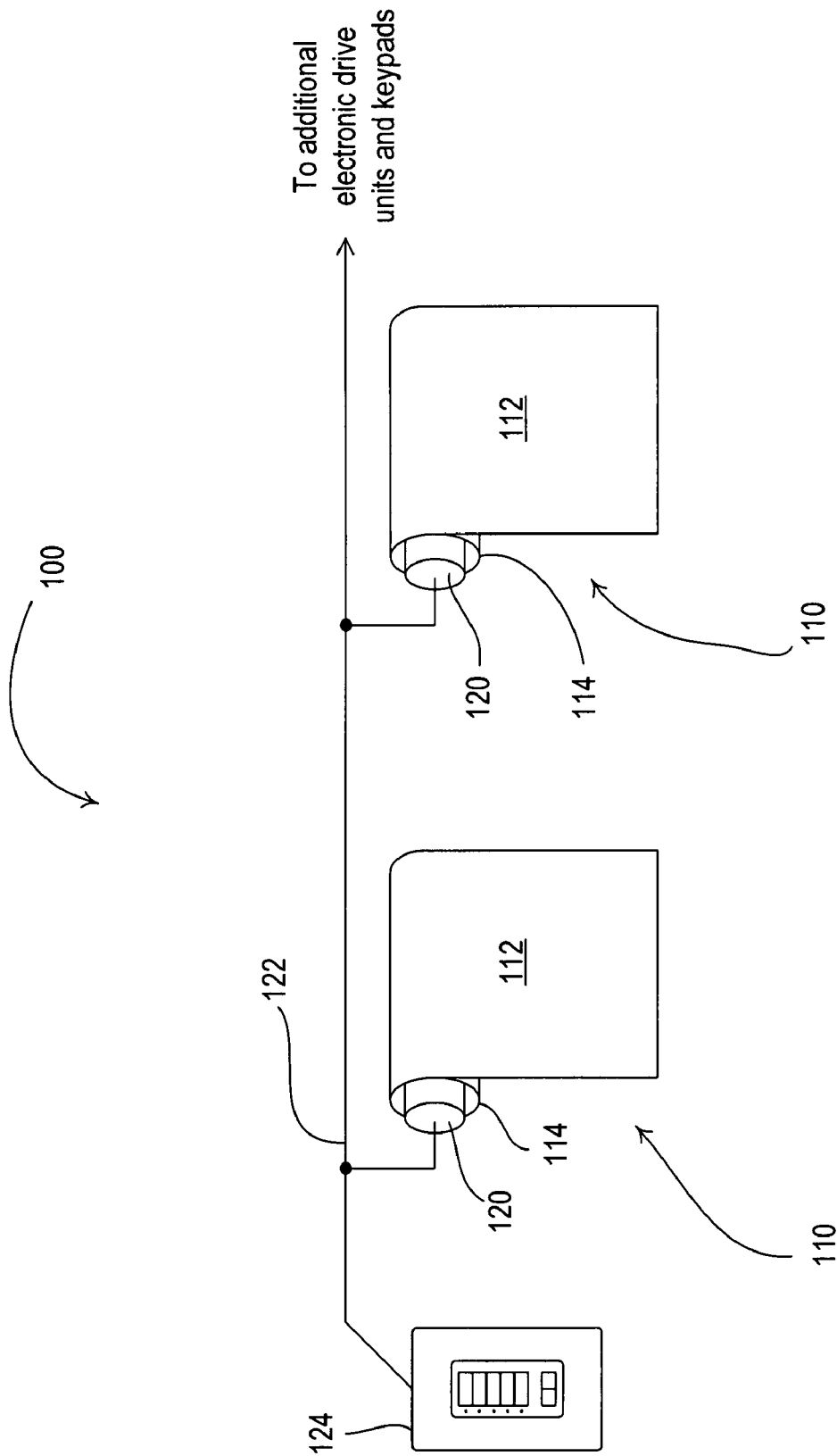
FIG. 1 is a simplified block diagram of the motorized window treatment control system comprising a plurality of motorized window shades.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of the motorized window treatment control system 100 according to the present invention. The motorized window treatment control system 100 comprises a plurality of motorized window shades 110, which each comprise a flexible shade fabric 112 rotatably supported by a roller tube 114. The motorized window treatments 110 are controlled by electronic drive units (EDUs) 120, which are preferably located inside the roller tube 114. The electronic drive units 120 are operable to control the shade fabrics 112 between an open position and a closed position. The motorized window shades 110 are coupled to a communication link 122 and are operable to receive commands from a keypad 124 across the communication link. The communication link 122 may comprise a wired communication link or a wireless communication link, such as, for example, a radio-frequency (RF) communication link or an infrared (IR) communication link. The control system 100 is described in greater detail in commonly-assigned U.S. Pat. No. 6,983,783, issued Jan. 10, 2006, entitled MOTORIZED CONTROL SYSTEM, the entire disclosure of which is hereby incorporated by reference.

Figure 2:
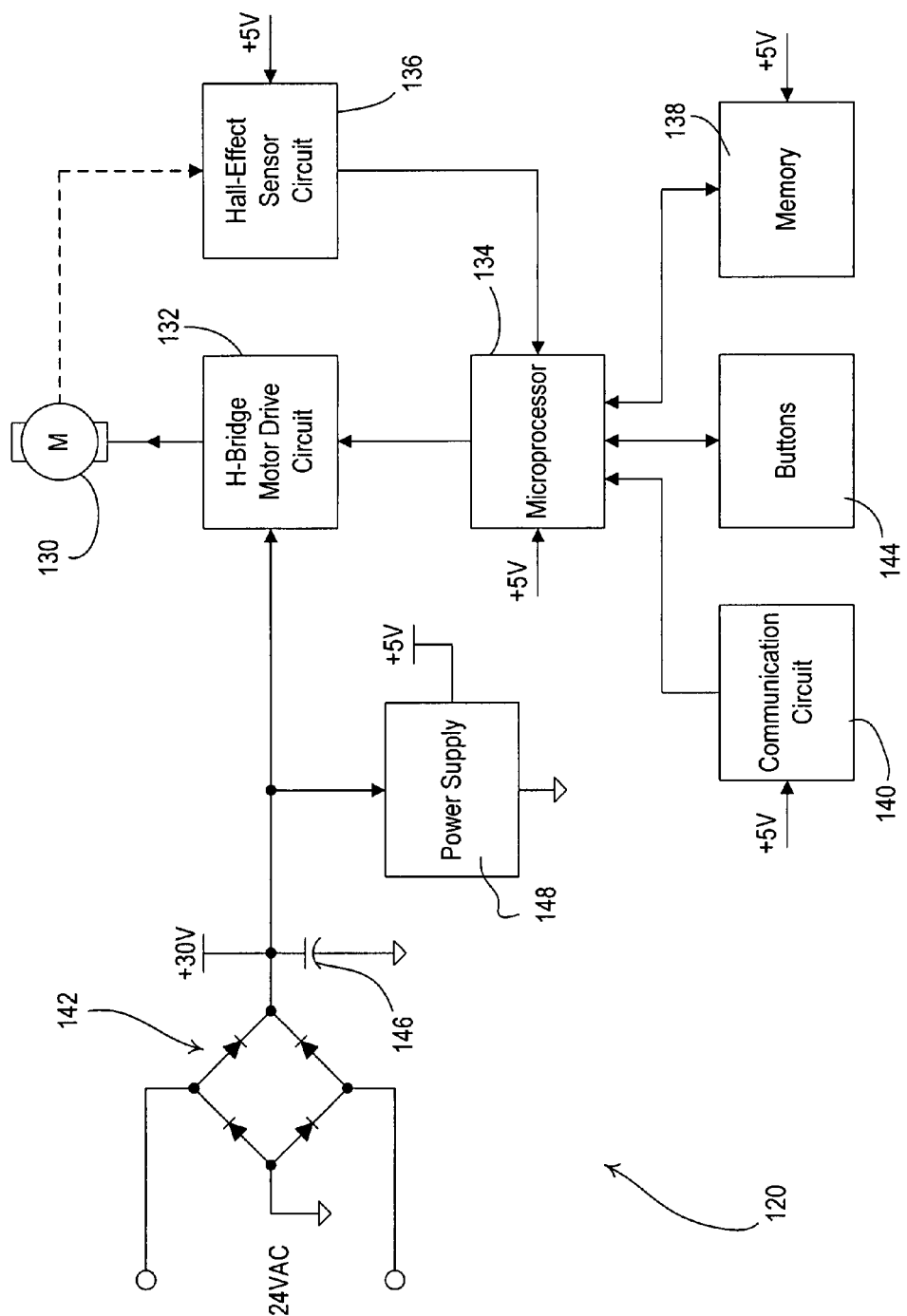
FIG. 2 is a simplified block diagram of the electronic drive unit of one of the motorized window shades of FIG. 1.

FIG. 2 is a simplified block diagram of the electronic drive unit 120 of the motorized window shade 110 according to the present invention. A DC motor 130 is coupled to the roller tube 114 and is operable to controllably rotate the roller tube at a constant speed when a constant DC voltage or a pulse-width modulated (PWM) signal having a constant duty cycle is applied to the motor. Changing the magnitude of the DC voltage or the duty cycle of the PWM signal applied to the DC motor 130 will change the rotational speed of the motor. Further, the DC motor 130 is operable to change the direction of rotation in response to a change in the polarity of the DC voltage or PWM signal applied to the DC motor.

To accomplish this level of control of the DC motor 130, the motor is coupled to an H-bridge motor drive circuit 132, which is driven by a microcontroller 134. The H-bridge motor drive circuit 132 comprises four transistors, such as, for example, four field effect transistors (not shown). The transistors are coupled such that, when two of the transistors are conductive, a positive DC voltage is applied to the DC motor 130 to cause the DC motor to rotate in a forward direction. When the other two transistors of the H-bridge circuit 132 are conductive, a negative DC voltage is applied to the DC motor 130 to cause the motor to rotate in the reverse direction. To control the speed of the DC motor 130, the microcontroller 134 preferably drives at least one of transistors of the H-bridge circuit 132 with a PWM signal. The microcontroller 134 may be any suitable controller, such as a programmable logic device (PLD), a microprocessor, or an application specific integrated circuit (ASIC).

The electronic drive unit 120 includes rotational position sensor, such as, for example, a Hall effect sensor (HES) circuit 136, which is operable to provide information regarding the rotational speed and the direction of the DC motor 130 to the microcontroller 134. The rotational position sensor may also comprise other suitable position sensors, such as, for example, optical and resistor sensors. The Hall effect sensor circuit 136 will be described in greater detail below with reference to FIGS. 3 and 4. The microcontroller 134 is operable to determine a rotational position of the motor 130 in response to the Hall effect sensor circuit 136. The microcontroller 134 uses the rotational position of the motor 130 to determine a present position of the shade fabric 112. The microcontroller 134 is coupled to a non-volatile memory 138 for storage of the present position of the shade fabric 112, the fully open position, and the fully closed position. The memory 138 preferably comprises an electrically erasable programmable read-only memory (EEPROM).

The electronic drive unit 120 comprises a communication circuit 140 that allows the microcontroller 134 to transmit and receive communication signals to and from the keypad 124 and other electronic drive units 120. The electronic drive unit 120 further comprises a plurality of buttons 144 that allow a user to provide inputs to the microcontroller 134 during setup and configuration of the motorized window shade 110. The buttons 144 preferably comprise a clockwise button and a counterclockwise button. The microcontroller 134 drives the motor 130 in a clockwise direction at a constant rotational speed while the clockwise button is pressed and held, and drives the motor in a counterclockwise direction at a constant rotational speed while the counterclockwise button is pressed.

The microcontroller 134 is operable to control the movement of the shade fabric 112 in response a shade movement command, e.g., from the communication signals received via the communication circuit 140 or the user inputs from the buttons 144. The shade movement command may consist of a command type (e.g., "move to a desired position" or "move at a constant rotational speed") and a desired position (to which the microcontroller 134 is operable to control the shade fabric 112). The desired position may be the preset position, the fully open position, or the fully closed position.

The electronic drive unit 120 receives power from a $24V_{AC}$ signal provided by an alternating-current power source (not shown). The $24V_{AC}$ signal is provided to a full-wave rectifier bridge 142 for generating a $30V_{DC}$ bus voltage, which is filtered by a storage capacitor 146. The $30V_{DC}$ bus voltage is provided to the H-bridge motor drive circuit 132 for driving the motor 130. A power supply 148 receives the $30V_{DC}$ bus voltage and generates a $5V_{DC}$ voltage for powering the low-voltage circuitry of the electronic drive unit 120 (i.e., the microcontroller 134, the memory 138, and the communication circuit 140).

Figure 3A:
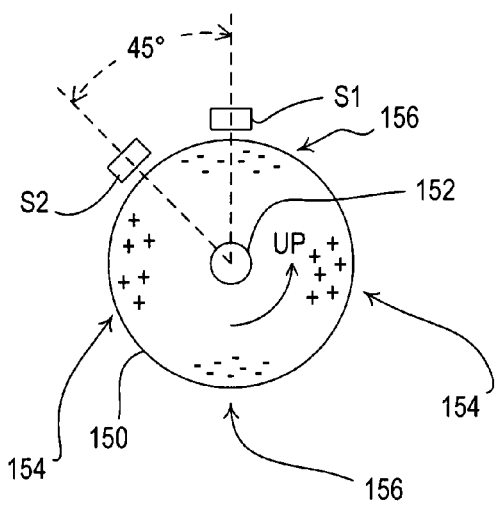
FIG. 3A is a partial schematic end view of the electronic drive unit of FIG. 2 showing the physical assembly of a Hall effect sensor circuit.

FIG. 3A is a partial schematic end view of the electronic drive unit 120 showing the physical assembly of the Hall effect sensor circuit 136. The Hall effect sensor circuit 136 comprises two Hall effect sensors S1, S2. The sensors S1, S2 are located in close proximity with a sensor magnet 150, which is secured to an output shaft 152 of the motor 130. The sensors S1, S2 are located adjacent the periphery of the magnet 150 and separated from each other by 45°. The sensor magnet 150 includes two positive poles 154 (i.e., "north" poles) and two negative poles 156 (i.e., "south" poles). Alternatively, the sensor magnet 150 may only include one positive pole and one negative pole.

Figure 3B:
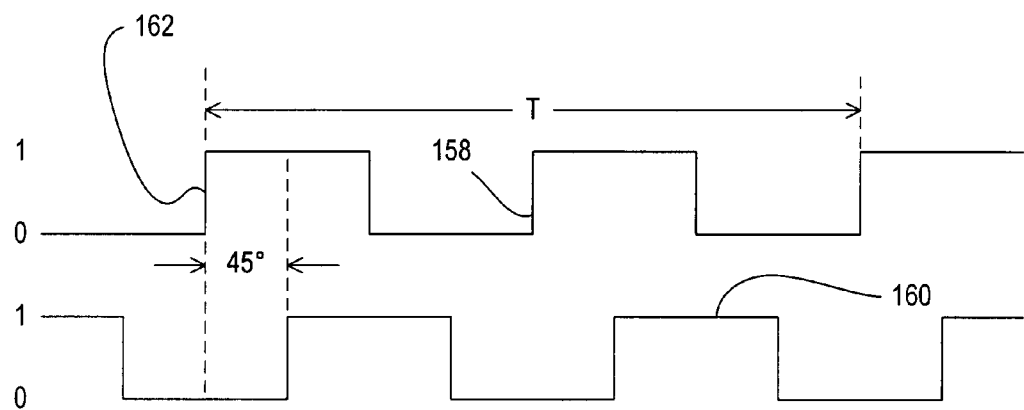
FIG. 3B is a diagram of a first output signal and a second output signal of the Hall effect sensor circuit of FIG. 3A.

FIG. 3B is a diagram of a first output signal 158 and a second output signal 160 of the sensors S1, S2, respectively. The sensors S1, S2 provide the output signals 158, 160 to the microcontroller 134 as a train of pulses in dependence upon whether each of the sensors are close to one of the positive poles 154 or one of the negative poles 156. For example, when the sensor magnet 150 rotates such that one of the north poles 154 moves near the first sensor S1 (rather than one of the adjacent negative poles 156), the first output signal 158 transitions from low (i.e., a logic zero) to high (i.e., a logic one) as shown by the edge 162 in FIG. 3B. When the sensor magnet 150 has two positive poles and two negative poles, the output signals 158, 160 have two rising edges and two falling edges per revolution of the output shaft 152.

The frequency, and thus the period T, of the pulses of the output signals 158, 160 is a function of the rotational speed of the motor output shaft 152. The relative spacing between the pulses of the first and second output signals 158, 160 is a function of rotational direction. When the motor 130 is rotating in a counterclockwise direction of the motor output shaft 152 (marked "UP" in FIG. 3A), the second output signal 160 lags behind the first output signal 158 by approximately 45° or ⅛ of the period T. When the motor 130 is rotating in the opposite direction, the second output signal 160 leads the first output signal 158 by approximately 45°. The operation of the H-bridge motor drive circuit 132 and the Hall effect sensor circuit 136 of the electronic drive unit 120 is described in greater detail in commonly-assigned U.S. Pat. No. 5,848,634, issued Dec. 15, 1998, entitled MOTORIZED WINDOW SHADE SYSTEM, and commonly-assigned U.S. Pat. No. 6,497,267, issued Dec. 24, 2002, entitled MOTORIZED WINDOW SHADE WITH ULTRAQUIET MOTOR DRIVE AND ESD PROTECTION. The entire disclosures of both patents are herein incorporated by reference.

The microcontroller 134 stores the present position of the shade fabric 112 in the memory 138 as a number of Hall effect sensors edges between the present position of the shade fabric and the open position. A Hall effect sensor edge is, for example, a low-to-high transition of the first output signal 158 as shown in FIG. 3B. The microcontroller 134 also stores the fully open position and the fully closed position in the memory 138 in terms of Hall effect sensor edges. During the setup and configuration of the electronic drive unit 120, the fully open position and the fully closed position are set and stored in the memory 138.

According to the present invention, the microcontroller 134 is operable to store the present position of the shade fabric 112 in the memory 138 each time the microcontroller 134 receives a Hall effect sensor edge of, for example, the first output signal 158 of FIG. 3B. Preferably, the microcontroller 134 stores the present position at least once every eight (8) Hall effect sensor edges, i.e., every two rotations of the motor 130. Further, when the microcontroller 134 receives the shade movement command, the microcontroller 134 is operable to store the command (e.g., including the command type and the desired final position of the shade fabric 112 after the command is executed) in the memory 138.

The $30V_{DC}$ bus voltage (provided by the rectifier 142) and the $5V_{DC}$ voltage (generated by the power supply 148) may fluctuate or decrease in response to a motor overload condition, a low-line condition, or an ESD event. For example, if the motor 130 is overloaded, the current drawn by the motor may suddenly increase. This large current may be larger than the magnitude of the current provided to the storage capacitor 146 through the rectifier 142, and thus the voltage across the storage capacitor may decrease. Further, the AC power source supplying power to the electronic drive unit 120 may be current limited, such that the voltage supplied by the AC power source may decrease in response to the large current drawn by the motor 130 during the overload condition. Accordingly, the $5V_{DC}$ voltage supplied by the power supply 142 may decrease below the voltage level required by the microcontroller 134 to remain operational during the overload condition, thus causing the microcontroller 134 to reset.

If the microcontroller 134 of the electronic drive unit 120 of the present invention resets, the microcontroller is operable to immediately recall the present position of the shade fabric 112 and the present command (i.e., the command type and the desired position) from the memory 138. The microcontroller 134 then continues moving the shade fabric 112 to the final destination with little delay or loss of positional accuracy.

A motor overload condition may last for a long enough period of time, such that the microcontroller 134 may repeatedly reset. The microcontroller 134 uses a reset counter to keep track of the number of the times that the microcontroller sequentially resets while the shade fabric 112 is moving prior to reaching the desired position. The microcontroller 134 only retries to move the shade fabric 112 (i.e., only consecutively resets) a predetermined number of times, e.g., approximately 25 times, before ceasing to drive the motor 130, although the predetermined number of time may comprise a number larger or smaller than 25.

The microcontroller 134 is further operable to determine if the motor 130 is operating in a stall condition, rather than an overload condition. A stall occurs when the microcontroller 134 attempts to drive the motor 130, however the motor 130 does not rotate or rotates less than a predetermined amount, e.g., only one rotation of the motor. During an overload condition, the motor 130 typically rotates more than one rotation of the motor. In response to repeatedly detecting a stall of the motor 130, the microcontroller 134 increments the reset counter at a faster rate, e.g., such that the microcontroller only retries to rotate the motor approximately five (5) times in the event of a stall.

If the shade movement command originates from the buttons 144 of the electronic drive unit 120 and the microcontroller 134 resets while the shade fabric 112 is moving, the microcontroller 134 does not attempt to drive the motor 130 upon resetting. Typically, the buttons 144 are accessed by a user while the electronic drive unit is being installed. Since the buttons 144 are physically located on the electronic drive unit 120, which is installed in the roller tube 114, the user typically must climb a ladder to access the buttons. As a safety feature, the method of the present invention (i.e., to drive the motor 130 after resetting) is disabled when the shade movement command originates from the buttons 144 of the electronic drive unit 120.

As previously mentioned, the microcontroller 134 is operable to store the present position of the shade fabric 112 in the memory 138 at each Hall effect sensor edge. Preferably, the microcontroller 134 stores the position values sequentially in a position table 190 in the memory 138 (shown in FIG. 4). Each memory location of the memory 138 comprises, for example, four bytes. The position values stored in the memory locations of the memory 138 preferably each comprise two bytes. Each time the present position is stored in the memory 138, the microcontroller 134 increments a two-byte memory counter. When saving a position value to a memory location, the microcontroller 134 stores the memory counter in the additional two bytes of the memory location. Preferably, the memory locations that the sequential positions are stored in are also sequential. The plurality of position values in the memory 138 provide a record of the movement of the shade fabric 112.

Figure 5:
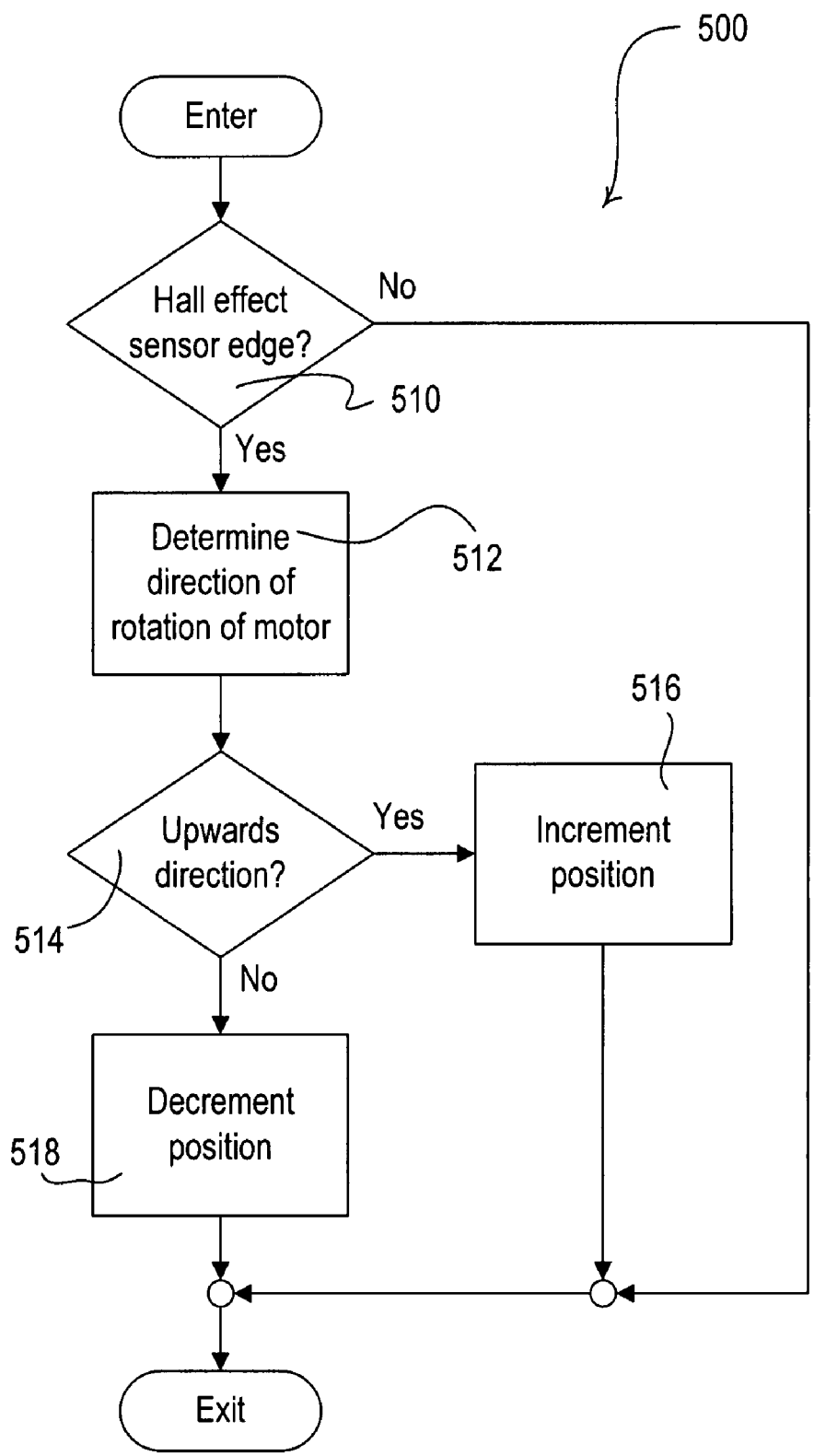
FIG. 5 is a simplified flowchart of a Hall effect sensor edge procedure executed by the microcontroller of the electronic drive unit of FIG. 2.

FIG. 5 is a simplified flowchart of a Hall-effect sensor edge procedure 500 executed periodically by the microcontroller 134, e.g., every 572 μsec. If the microcontroller 134 has received a Hall-effect sensor edge from the Hall-effect sensor circuit 136 at step 510, the microcontroller 134 determines the direction of rotation of the motor 130 by comparing the consecutive edges of the first and second output signals 158, 160 at step 512. For example, if the second output signal 160 is lagging behind the first output signal 158 by approximately 45°, the motor 130 is rotating the roller tube such that the shade fabric 112 is moving in an upwards direction (as shown in FIG. 3A).

If the motor 130 is rotating in the upwards direction at step 514, the microcontroller 134 increments the present position (i.e., in terms of Hall-effect sensor edges) by one at step 516. If the motor 130 is rotating in the downwards direction at step 514, the microcontroller 134 decrements the present position by one at step 518. After the present position is incremented or decremented at steps 516 and 518 respectively, the procedure 500 exits. If the microcontroller 134 has not received a Hall-effect sensor edge at step 510, the procedure 500 simply exits.

Figure 6:
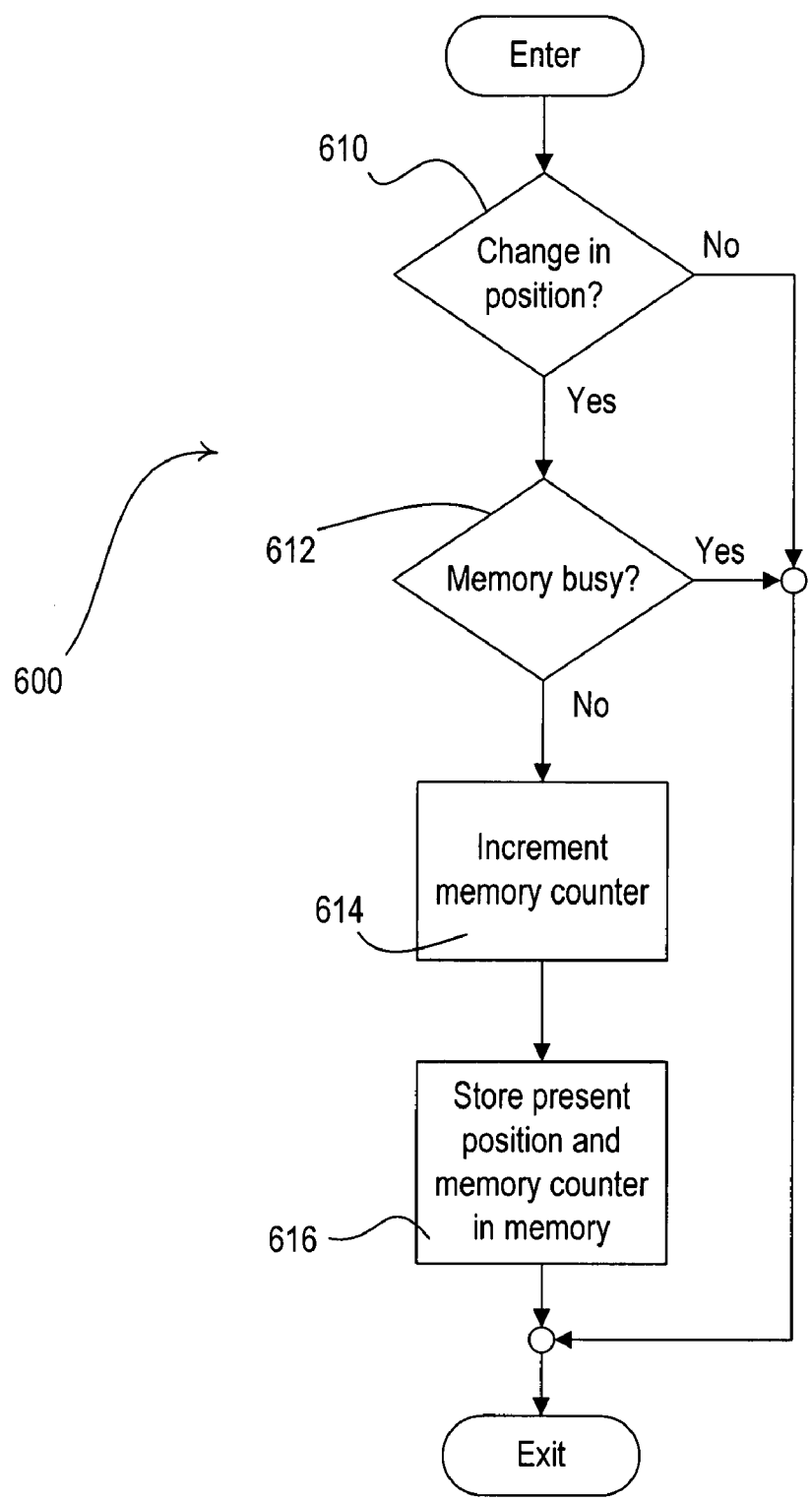
FIG. 6 is a simplified flowchart of a position memory storage procedure executed by the microcontroller of the electronic drive unit of FIG. 2.

FIG. 6 is a simplified flowchart of a position memory storage procedure 600 according to the present invention. The position memory storage procedure 600 is preferably executed periodically by the microcontroller 134, for example, every four (4) msec. If the microcontroller 134 determines that the present position has recently changed (e.g., incremented or decremented by the Hall-effect sensor edge procedure 500) at step 610, a determination is made at step 612 as to whether the memory 138 is presently busy writing or reading data. If not, the microcontroller 134 increments the memory counter at step 614 and stores the present two-byte position and the two-byte memory counter value in the next memory location of the memory 138 at step 616, before the procedure 600 exits. If the present position has not recently changed at step 610 or if the memory 138 is busy at step 612, the procedure 600 simply exits. Accordingly, the position memory storage procedure 600 stores the present position of the shade fabric 112 each time the microcontroller 134 receives a Hall effect sensor edge unless the memory 138 is busy.

Figure 4:
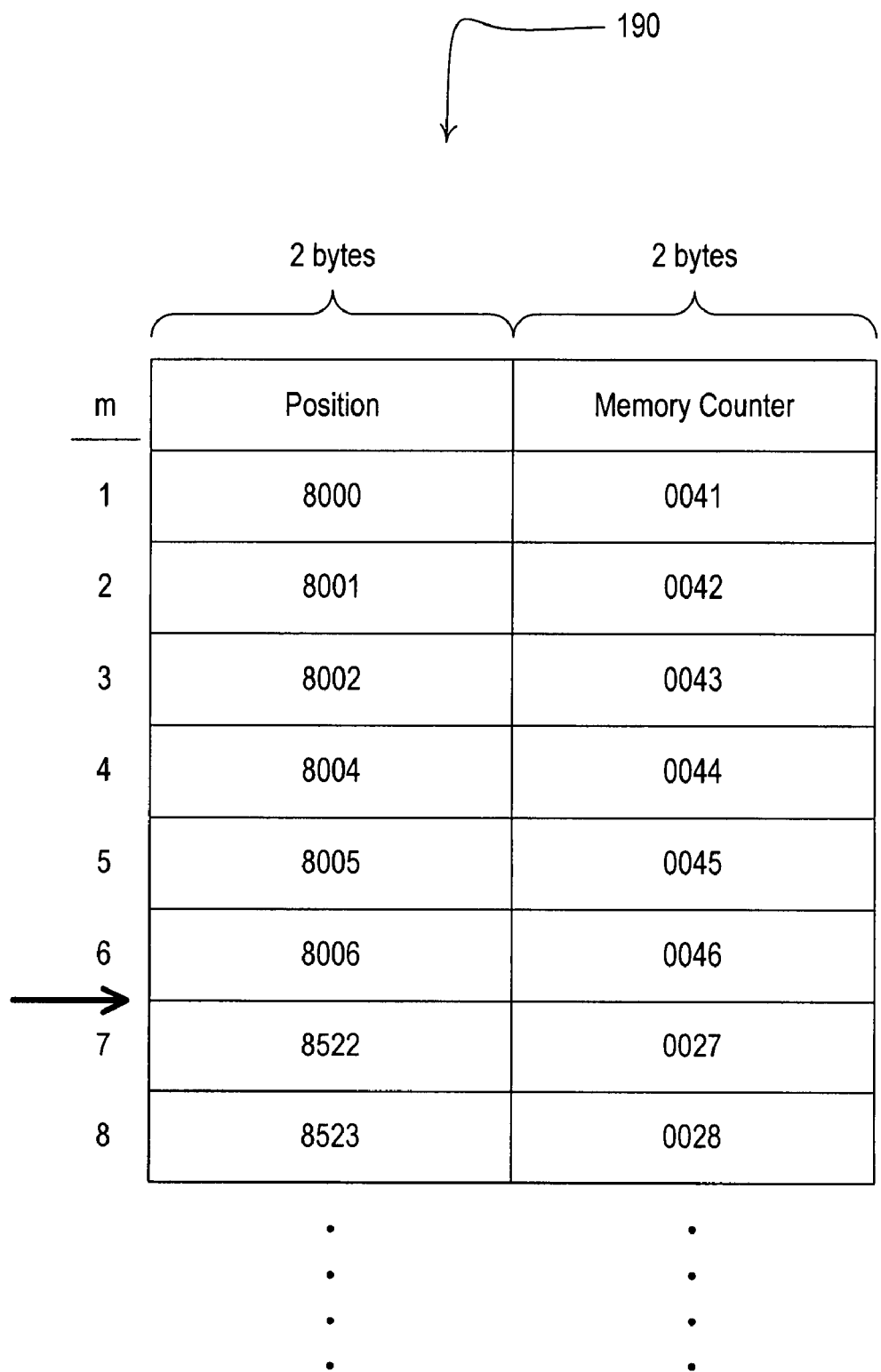
FIG. 4 is a simplified diagram of a position table used by a microcontroller of the electronic drive unit of FIG. 2.
Figure 7A:
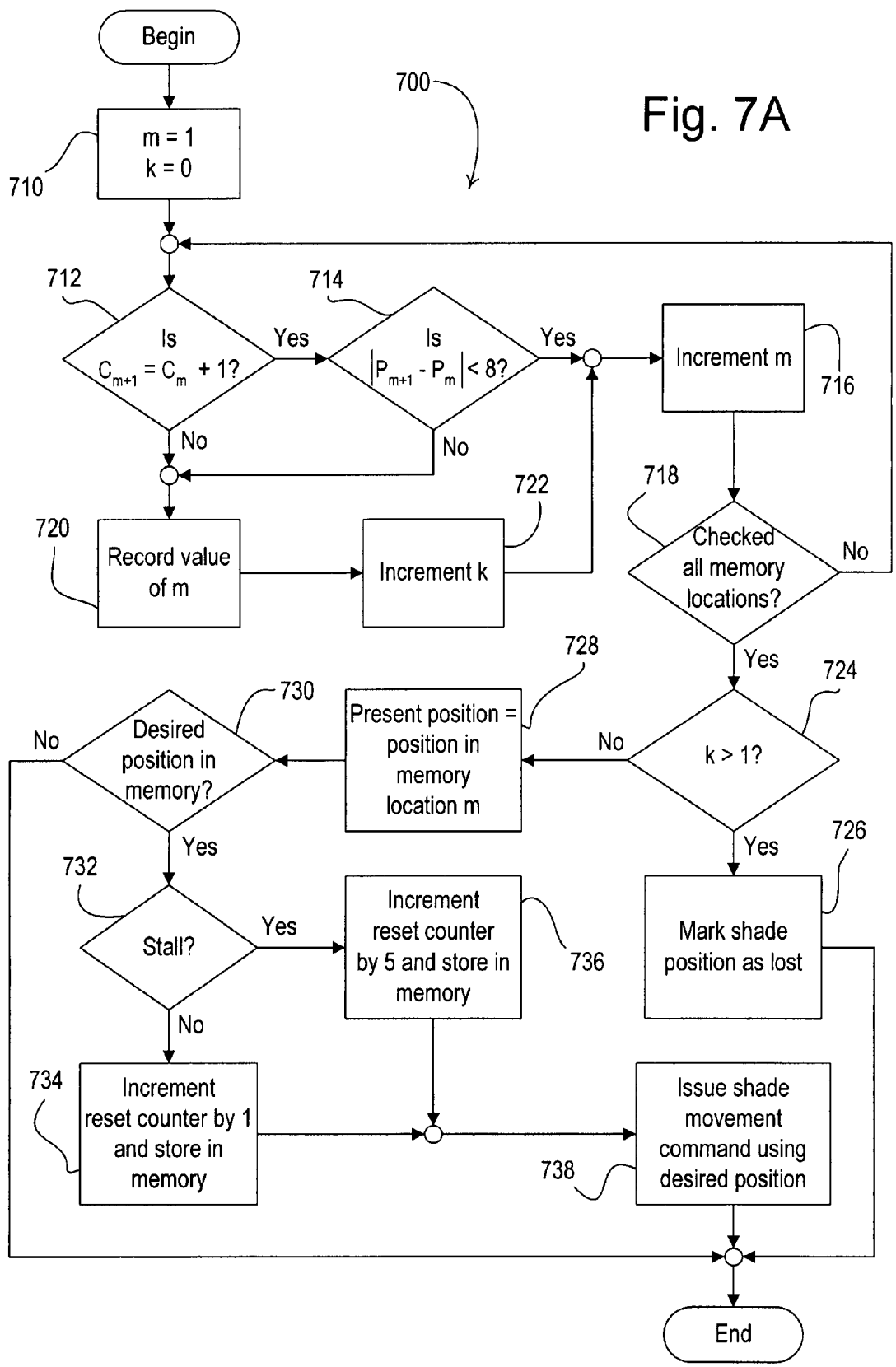
FIG. 7A is a simplified flowchart of a startup procedure executed by the microcontroller of the electronic drive unit of FIG. 2 whenever the microcontroller is powered up.

FIG. 7A is a simplified flowchart of a startup procedure 700 executed by the microcontroller 134 whenever the microcontroller is powered up, for example, if the microcontroller resets. The startup procedure 700 first examines the position table 190 stored in the memory 138 to determine the present position of the shade fabric 112. The microcontroller 134 searches for the location in the position table 190 where the sequential entries end, e.g., between memory locations six (6) and seven (7) as shown in FIG. 4. The startup procedure 700 uses a variable m to keep track of the memory locations that are presently being examined and a variable k to count the number of discontinuities discovered in the position table 190. If more than one discontinuity is discovered, the data of the position table 190 is considered corrupt and the position of the shade fabric 112 is noted as lost.

At step 710, the variable m is set to one and the variable k is set to zero. Next, the microcontroller 134 determines if the memory counter values are sequential in the position table 190 at step 712 by determining if the memory counter value in the next memory location (i.e., $C_{m+1}$) is one more than the memory counter in the present memory location (i.e., $C_m$). If the memory counter values are sequential in the two examined memory locations at step 712, the microcontroller 134 determines if the positions in the same two memory locations are substantially sequential, i.e., within eight (8) Hall effect sensor edges, at step 714. Specifically, a determination is made at step 714 as to whether the position in the next memory location is not more than eight (8) Hall effect sensor edges away from the position in the present memory location. If so, the microcontroller 134 increments the variable m at step 716, such that the microcontroller is ready to examine the next memory location. If the microcontroller 134 has not examined all of the memory locations in the position table 190 in the memory 134 at step 718, the process loops around to determine if the memory counter values are sequential and the positions are substantially sequential at steps 712 and 714.

If a discontinuity is noticed in the data of the position table 190 at step 712 or step 714, the microcontroller 134 records the present value of the variable m at step 720 and increments the variable k at step 722. The procedure 700 continues to loop until the microcontroller 134 has examined all memory locations at step 718. If the variable k is greater than one (1) at step 724 (i.e., more than one discontinuity was discovered in the position table 190), the microcontroller 134 marks the shade position as lost at step 726 and the procedure 700 exits. When the shade position is lost, the microcontroller 134 does not allow movement of the shade fabric 112 until the open and closed limits are once again set.

If the variable k is not greater than one (1) at step 724, the most recent position of the shade fabric 112 in the position table 190 is in the memory location represented by the variable m in the memory 134, and thus, the present position of the shades is retrieved from the memory location represented by the variable m at step 728. If the desired position (i.e., from the present command), is not stored in the memory 134 at step 730, the procedure 700 simply exits. Otherwise, if the desired position is stored in the memory 134 at step 730, a determination is made at step 732 as to whether the motor 130 has stalled, i.e., if the present position of the shade fabric 112 is not more than, for example, four (4) Hall effect sensor edges from an initial position of the shade fabric. The microcontroller 134 stores the initial position of the shade fabric 112 in the memory 138 when the microcontroller first receives a shade movement command and first staffs moving, as will be described in greater detail below with reference to FIGS. 6A and 6B.

If the motor has not stalled at step 732, the microcontroller 134 increments the reset counter by one (1) and stores the reset counter in the memory 138 at step 734. If the motor has stalled at step 732, the reset counter is incremented by five (5) and is stored in the memory 138 at step 736. Therefore, the reset counter reaches the maximum reset counter value, i.e., 25 resets, more quickly if the motor 130 has stalled. If the microcontroller 134 detects a stall, the microcontroller retries driving the motor 130 fewer times than if the motor is overloaded. After the reset counter is incremented at step 734 or step 736, the microcontroller 134 issues a shade movement command using the desired position (i.e., from the present command stored in the memory 138) at step 738.

Figure 7B:
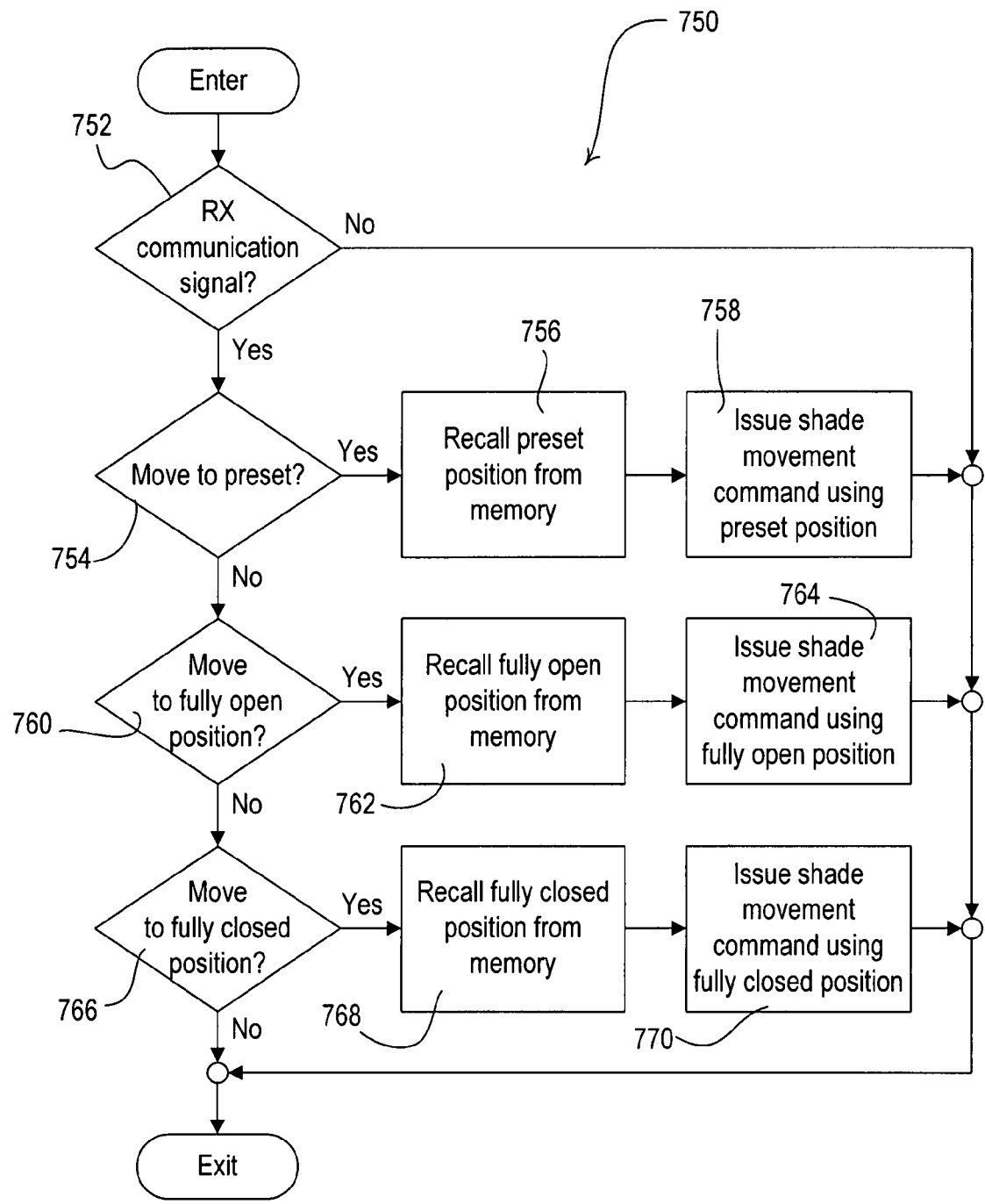
FIG. 7B is a simplified flowchart of a communication signal procedure executed by the microcontroller of the electronic drive unit of FIG. 2.

FIG. 7B is a simplified flowchart of a communication signal procedure 750, which is executed by the microcontroller 134 periodically, e.g., every five (5) msec. If the microcontroller 134 has received a communication signal via the communication circuit 140 at step 752, the microcontroller determines what specific command is included in the communication signal at steps 754, 760, and 766. If the command is a "move to preset" command at step 754, the microcontroller 134 recalls the preset position (i.e., in terms of Hall effect sensors edges) from the memory 138 at step 756. The microcontroller 134 then issues a shade movement command using the preset position at step 758, and the procedure 750 exits. If the command is a "move to fully open position" command at step 760, the microcontroller 134 recalls the fully open position from the memory 138 at step 762, issues a shade movement command using the fully open position at step 764, and exits the procedure 750. Similarly, if the command is a "move to fully closed position" command at step 766, the microcontroller 134 recalls the fully closed position from the memory 138 at step 768 and issues a shade movement command using the fully closed position at step 770, before exiting the procedure 750.

Figure 7C:
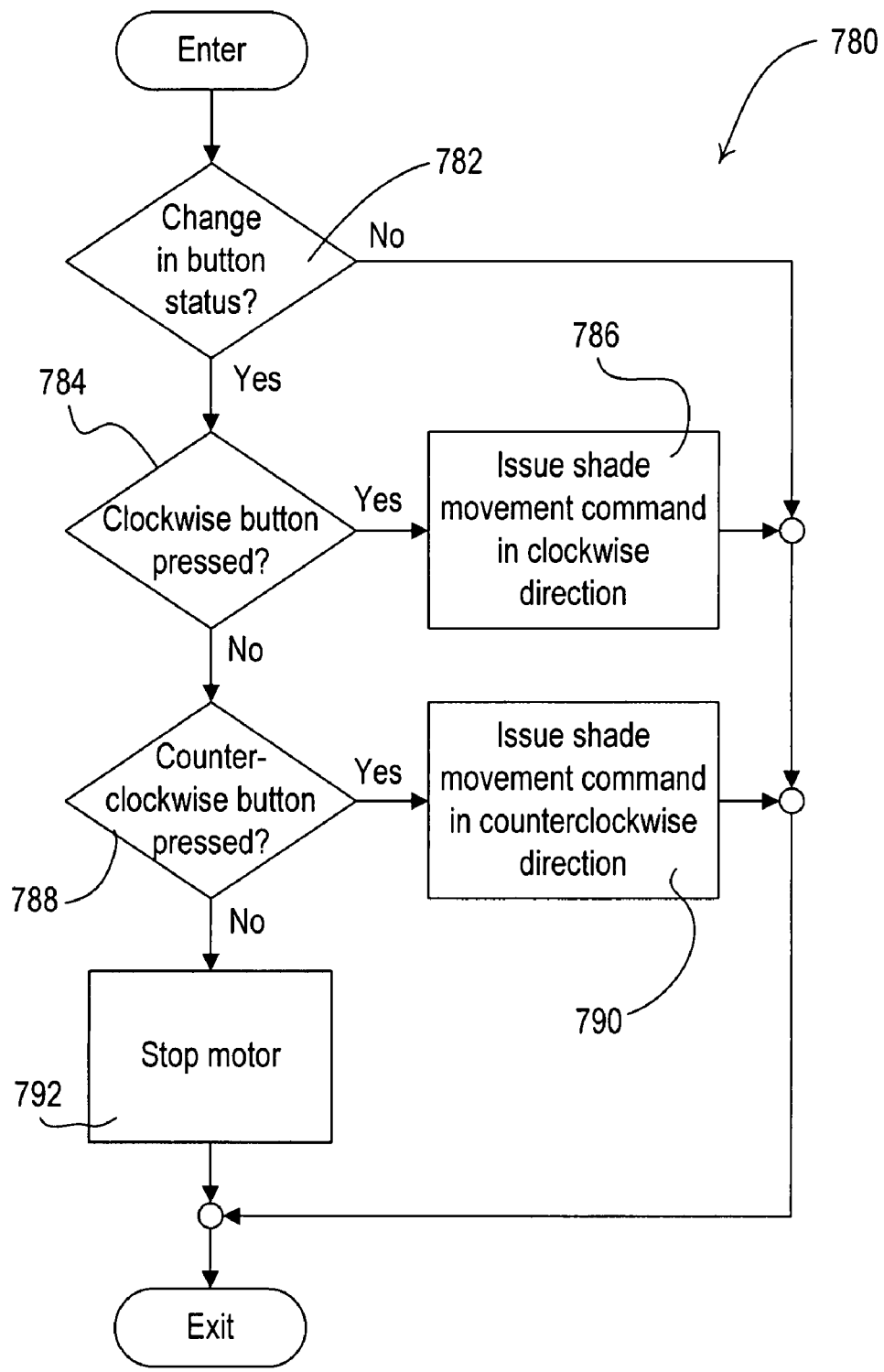
FIG. 7C is a simplified flowchart of a button procedure executed by the microcontroller of the electronic drive unit of FIG. 2.

FIG. 7C is a simplified flowchart of a button procedure 780, which is executed by the microcontroller 134 periodically, e.g., every five (5) msec, to monitor the buttons 144. If there has not been a recent change in the status of the buttons 144 at step 782 (i.e., neither the clockwise button nor the counterclockwise button have not just been pressed or released), the button procedure 780 simply exits. However, if there has been a change in button status at step 782 and the clockwise button has just been pressed at step 784, the microcontroller 134 issues a shade movement command to move the motor 130 in the clockwise direction at a constant rotational speed at step 786. If the clockwise button was not just pressed at step 784, but the microcontroller 134 determines that the counterclockwise button was just pressed at step 788, the microcontroller issues a shade movement command at step 790, such that the motor 130 rotates in the counterclockwise direction at a constant rotational speed. If there has been a change in the button status at step 782, but the clockwise and counterclockwise buttons have not just been pressed at steps 784 and 788, the microcontroller 134 determines that either of the buttons has been release and accordingly stops the motor 130 at step 792 before exiting the procedure 780.

Figure 8A:
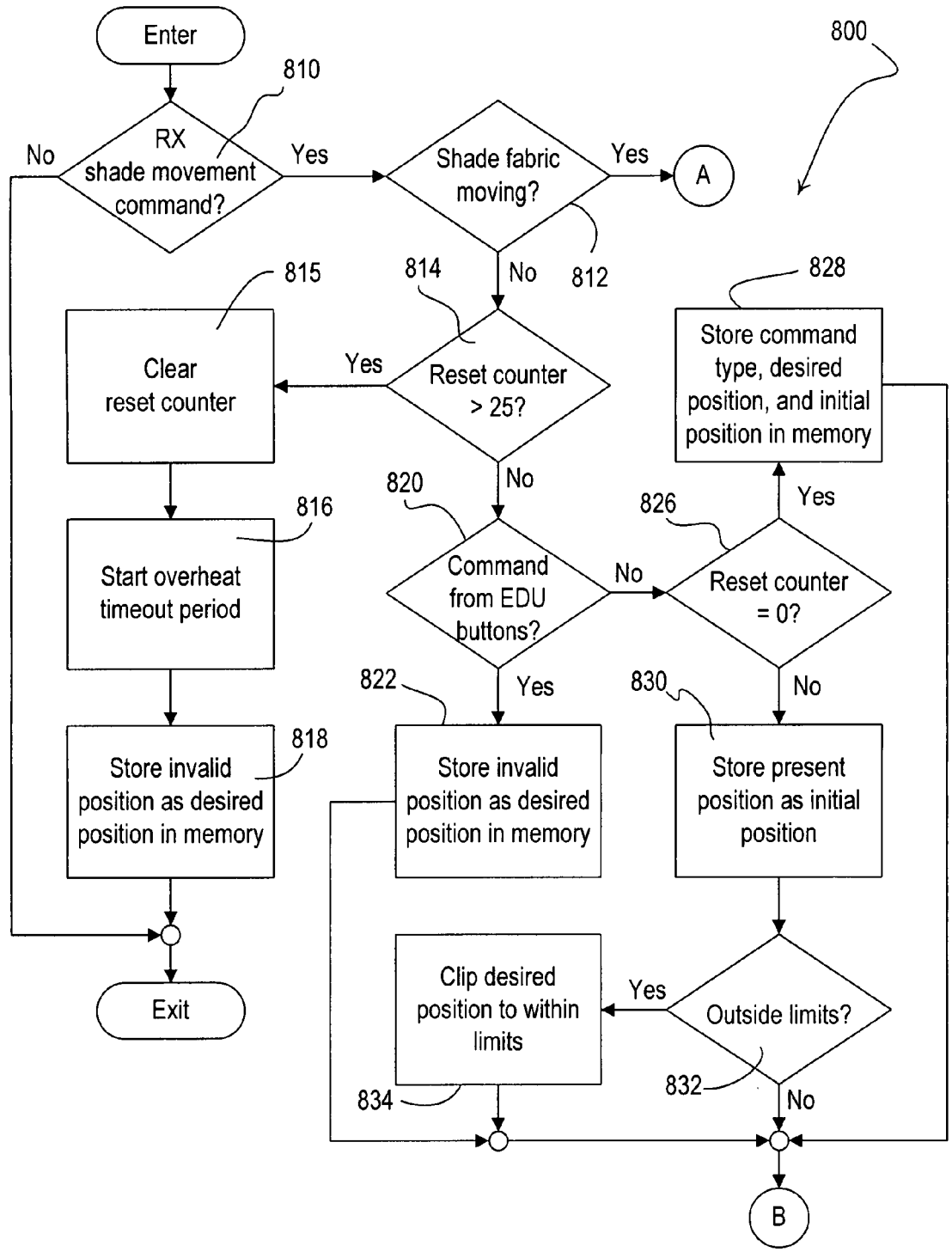
FIGS. 8A and 8B are simplified flowcharts of a shade movement procedure executed by the microcontroller of the electronic drive unit of FIG. 2.
Figure 8B:
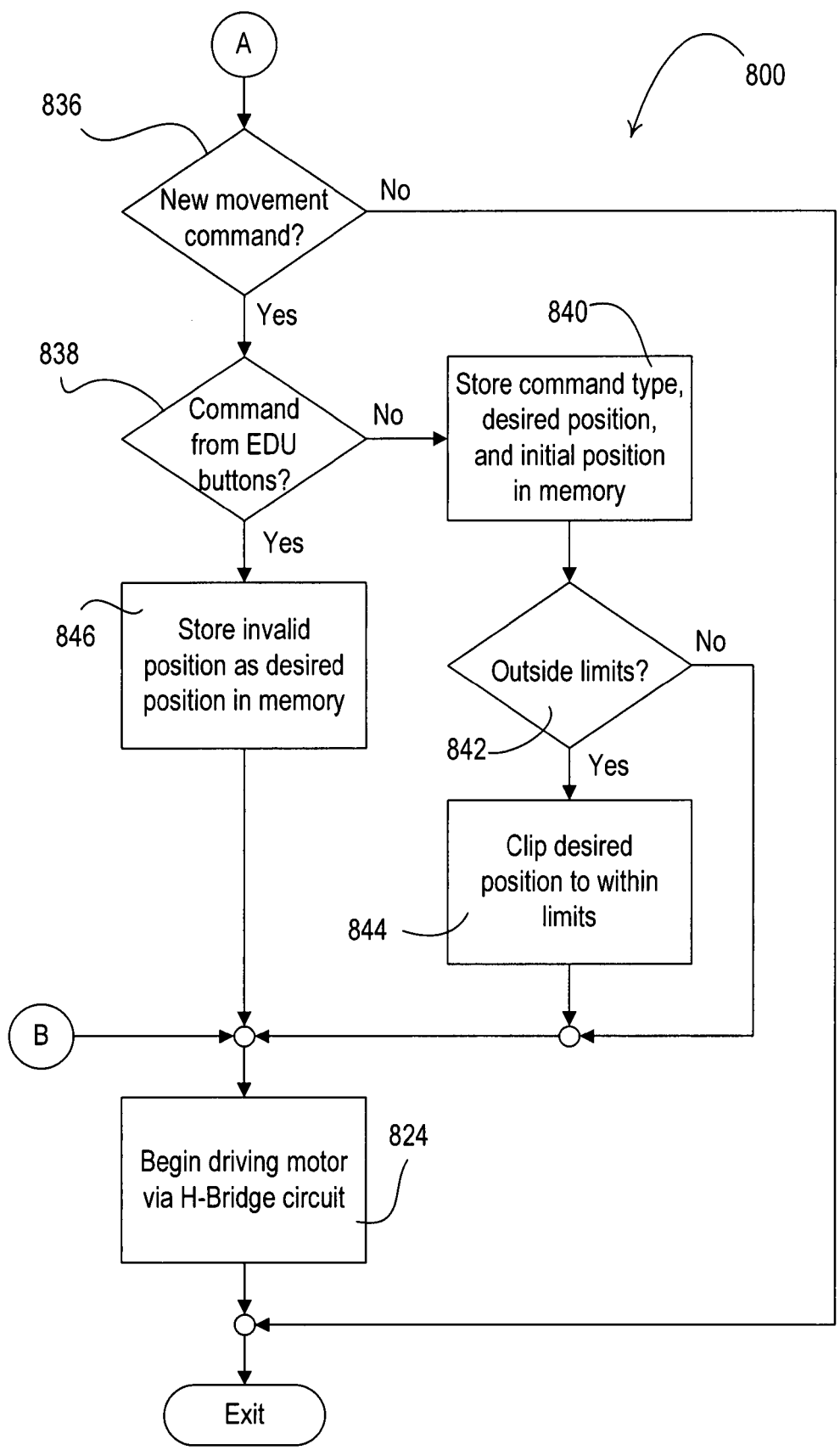

FIGS. 8A and 8B are simplified flowcharts of a shade movement procedure 800, which is executed by the microcontroller 134 periodically, e.g., approximately every ten (10) msec. The shade movement procedure operates on shade movement commands that may be issued in response to a communication signal received via the communication link 122 (i.e., at steps 758, 764, and 770 of FIG. 7B) or from the user inputs provided by the buttons 144 of the electronic drive unit 120 (i.e., at steps 786 and 790 of FIG. 7C). The shade movement commands may also be issued by the microcontroller 134 during the startup procedure 700 (i.e., at step 738 of FIG. 7A). If the microcontroller 134 is repeatedly resetting because of a motor overload condition, the startup procedure 700 issues the shade movement command and the shade movement procedure 800 then operates on the shade movement command.

If the microcontroller 134 has received a shade movement command at step 810, and the shade fabric 112 is not presently moving at step 812, a determination is made at step 814 as to whether the reset counter has exceeded a predetermined threshold, e.g., 25. If the reset counter has exceeded the predetermined threshold at step 814, the microcontroller 134 clears the reset counter at step 815 and starts an overheat timeout period at step 816. During the overheat timeout period, the microcontroller 134 prevents the motor 130 from rotating for a predetermined amount of time, e.g., approximately 20 minutes, after the reset counter has exceeded the predetermined threshold. The microcontroller 134 then stores an invalid position (e.g., 0xFF in hexadecimal) as the desired position in the memory 134 at step 818 and the procedure 800 exits. If the invalid position is stored as the desired position, the microcontroller 134 does not attempt to drive the motor 130 after another reset.

If the reset counter is not greater than 25 at step 814, but the shade movement command originated from the buttons 144 of the electronic drive unit 120 at step 820, the microcontroller 134 stores the invalid position as the desired position in the memory 134 at step 822, i.e., the microcontroller does not attempt to drive the motor after the next reset. The microcontroller 134 then begins driving the motor 130 via the H-bridge motor drive circuit 132 in accordance with the new command at step 824 (as shown in FIG. 8B).

If the shade movement command is not from the buttons 144 of the electronic drive unit 120 at step 820, but the reset counter is equal to zero at step 826, a new shade movement command has been received. Accordingly, the microcontroller 134 stores the new command type, the desired position, and the initial position (i.e., the present position when the command is received) in the memory 134 at step 828. The microcontroller 134 then begins driving the motor 130 via the H-bridge motor drive circuit 132 in accordance with the new command at step 824.

If the reset counter is not equal to zero at step 826, the microcontroller 134 stores the present position as the initial position in the memory at step 830. If the shade movement command would not send the shade fabric 112 outside the open and closed limits at step 832, the motor is driven appropriately at step 824. Otherwise, the desired position is clipped (i.e., adjusted) to be within the open and closed limits at step 834 and the motor is driven accordingly at step 824.

Referring to FIG. 8B, if the shade fabric 112 is presently moving at step 812 and the microcontroller 134 has received a new shade movement command (i.e., having a different desired position) at step 836, a determination is made at step 838 as to whether the shade movement command originated from the buttons 144 of the electronic drive unit 120. If not, the microcontroller stores the new command type, the new desired position, and the initial position in the memory 134 at step 840. If the new command would cause the shade fabric 112 to move outside the open and closed limits at step 842, the microcontroller 134 adjusts the desired position to be within the open and closed limits at step 844. If the shade movement command is from the buttons 144 at step 838, the microcontroller 134 stores the invalid position in as the desired position at step 846. Finally, the microcontroller 134 appropriately drives the motor 130 at step 824.

Figure 9:
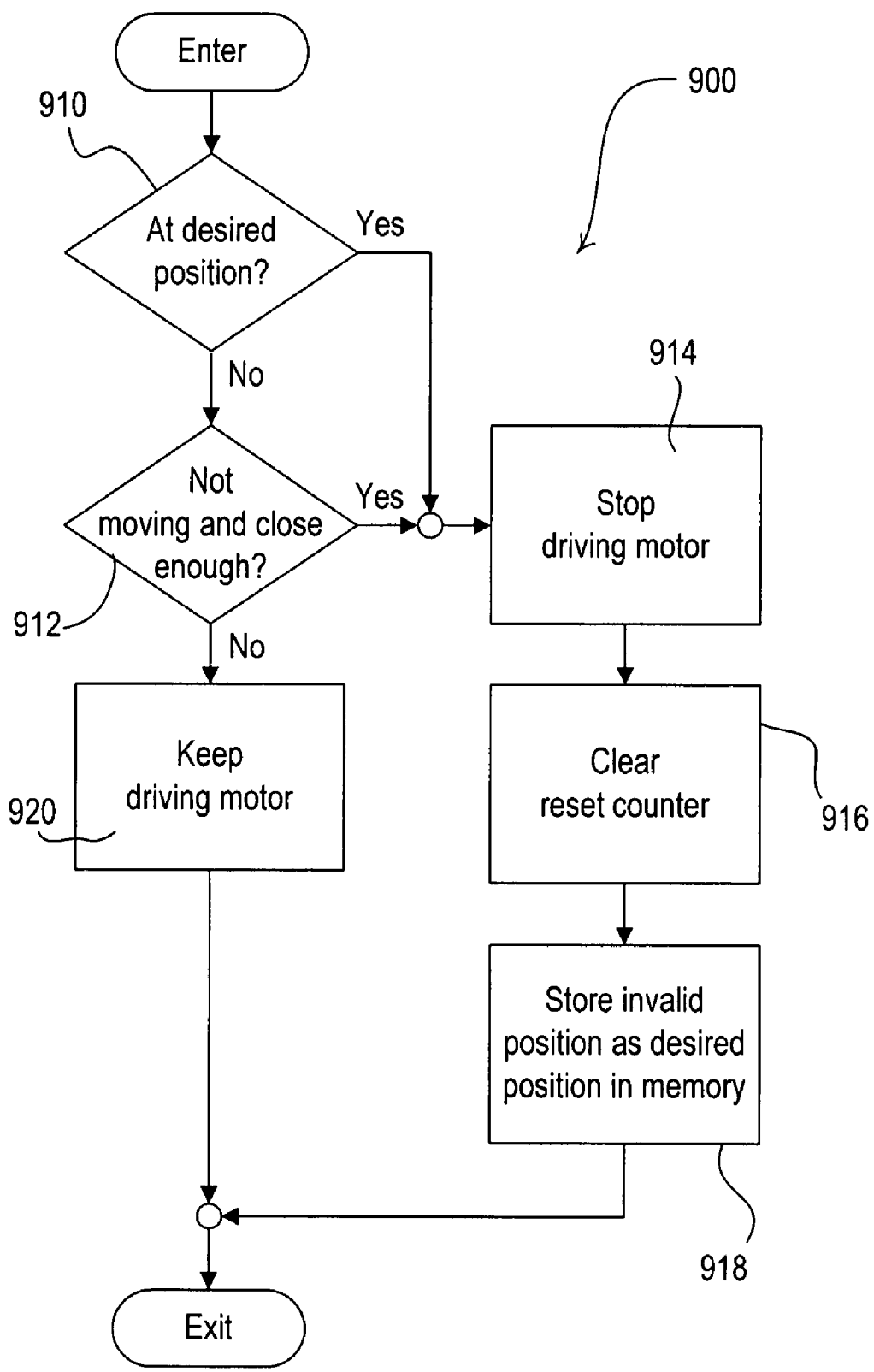
FIG. 9 is a simplified flowchart of a motor procedure executed by the microcontroller of the electronic drive unit of FIG. 2.

FIG. 9 is a simplified flowchart of a motor procedure executed periodically by the microcontroller 134, for example, approximately every 6 msec. If the shade fabric 112 is at the desired position at step 910 or if the shade fabric is not moving, but is close enough to the desired position (e.g., within eight Hall effect sensor edges) at step 912, the microcontroller 134 stops driving the motor 130 at step 914. The microcontroller 134 then clears the reset counter at step 916 and stores the invalid position in as the desired position at step 918, before the procedure 900 exits. If the shade fabric is not at the desired position at step 910 and is not close enough to the desired position at step 912, the microcontroller 134 continues to drive the motor 130 at step 920 and exits the procedure 900.

The present invention describes an open loop algorithm for controlling a motorized roller shade through a disruptive event, such as a motor overload condition, a low-line condition, or an ESD event. A closed loop algorithm for controlling a motorized roller shade through a motor overload condition or a low-line condition is described in co-pending commonly-assigned U.S. Provisional Patent Application, 60/923,907, filed the same day as the present application, and entitled METHOD OF CONTROLLING A MOTORIZED WINDOW TREATMENT, the entire disclosure of which is hereby incorporated by reference.

While the present invention has been described with reference to motorized roller shades, the method of the present invention could be applied to any type of motorized window treatment that includes a motor drive, such as, for example, motorized draperies and motorized Roman shades.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of controlling a motorized window treatment in response to a command, the motorized window treatment driven by an electronic drive unit having a motor, a controller, and a memory, the controller operable to determine the rotational position of the motor, the method comprising the steps of:

storing the command in the memory;

adjusting a present position of the motorized window treatment in response to the rotational position of the motor;

storing the present position of the motorized window treatment in the memory each time the rotational position of the motor has changed by a predetermined angle, such that a plurality of positions are stored in the memory;

recalling the command from the memory when the controller is reset;

examining the plurality of positions stored in the memory to locate a discontinuity in the plurality of positions when the controller is reset;

determining the present position of the motorized window treatment in response to locating the discontinuity in the plurality of positions; and automatically driving the motor in response to the command and the present position after the command has been recalled from the memory and the present position of the motorized window treatment has been determined.

2. The method of claim 1, further comprising the steps of:

incrementing a memory counter each time one of the plurality of positions is stored in the memory; and storing the present value of the memory counter in the memory each time one of the plurality of position is stored in the memory, such that a plurality of memory counter values are stored in the memory.

3. The method of claim 2, wherein the step of examining the plurality of positions stored in the memory to locate a discontinuity in the plurality of positions further comprises examining the plurality of positions and memory counter values stored in the memory to locate a discontinuity in the plurality of memory counter values; and wherein the step of determining the present position of the motorized window treatment further comprises determining the present position of the motorized window treatment in response to locating the discontinuity in the plurality of memory counter values.

4. The method of claim 1, further comprising the step of:

incrementing a reset counter when the controller is reset.

5. The method of claim 4, further comprising the step of:

stopping the motor when the value of the reset counter exceeds a predetermined threshold.

6. The method of claim 4, further comprising the steps of:

determining that the motor has stalled;

incrementing the reset counter more than once in response to the step of determining that the motor has stalled; and stopping the motor when the value of the reset counter exceeds a predetermined threshold.

7. The method of claim 1, further comprising the step of:

receiving a command to move the motorized window treatment to a desired position.

8. The method of claim 7, further comprising the step of:

determining if the command to move the motorized window treatment originated from a button of the electronic drive unit;

wherein the step of automatically driving the motor further comprises automatically driving the motor in response to the command recalled from the memory and the present position determined from the memory only if the command to move did not originate from the button of the electronic drive unit.

9. The method of claim 1, wherein the command comprises a desired position to which to move the motorized window treatment.

10. An electronic drive unit for controlling a motorized window treatment comprising:
a motor coupled to the motorized window treatment for moving the motorized window treatment;
a rotational position sensor coupled to the motor;
a motor drive circuit coupled to the motor;
a controller coupled to the motor drive circuit operable to drive the motor drive circuit so as to control the rotation of the motor to control the motorized window treatment in response to a command, the controller coupled to the rotational position sensor and operable to determine a rotational position of the motor, the controller further operable to adjust a present position of the motorized window treatment in response to the rotational position of the motor;
a memory coupled to the controller, such that the controller is operable to store the command in the memory, the controller further operable to store the present position of the motorized window treatment in the memory in response to determining that the rotational position of the motor has changed by a predetermined angle, such that the controller stores the present position of the motorized window treatment in the memory each time the rotational position of the motor changes by the predetermined angle, and a plurality of positions are stored in the memory;
wherein the controller is operable to recall the command from the memory after the controller is reset, examine the plurality of positions stored in the memory to locate a discontinuity in the plurality of positions, and determine the present position of the motorized window treatment in response to locating the discontinuity in the plurality of positions, the controller further operable to automatically drive the motor drive circuit in response to the command and the present position after the command has been recalled from the memory and the present position of the motorized window treatment has been determined.

11. The electronic drive unit of claim 9, wherein the rotational position sensor comprises a Hall effect sensor circuit operable to provide a control signal to the controller, the control signal comprising a plurality of Hall effect sensor edges representative of the rotational position of the motor, the controller operable to determine the present position of the motorized window treatment from the control signal, and to store the present position of the motorized window treatment in the memory each time one of the Hall effect sensor edges is received from the Hall effect sensor circuit, such that the plurality of positions are stored in the memory.

12. The electronic drive unit of claim 10, further comprising:
a button coupled to the controller;
wherein the controller is operable to generate a button command to drive the motor in response to an actuation of the button; and
wherein the controller does not automatically drive the motor drive circuit when the button is still held after the controller is reset in response to the button command.

13. The electronic drive unit of claim 10, further comprising:
a communication circuit coupled to the controller and operable to receive a communication signal via a communication link;
wherein the controller is operable to receive the command from the communication signal and to drive the motor in response to the command.

14. The electronic drive unit of claim 10, wherein the memory comprises a non-volatile memory.

15. A method of controlling a motorized window treatment through an overload condition in which a motor of the motorized window treatment draws substantially large amount of current of transitory duration, the method comprising the steps of:
adjusting a present position of the motorized window treatment in response to the rotational position of the motor;
storing the present position of the motorized window treatment in the memory each time the rotational position of the motor changes by the predetermined angle, such that a plurality of positions are stored in the memory;
storing a desired position of the motorized window treatment prior to the overload condition;
allowing a controller of the motorized window treatment to reset during the overload condition;
recalling the desired position after the overload condition;
examining the plurality of positions stored in the memory to locate a discontinuity in the plurality of positions;
determining the present position of the motorized window treatment in response to locating the discontinuity in the plurality of positions; and
automatically driving the motor of the motorized window treatment in response to the desired position and the present position after the desired position has been recalled and the present position of the motorized window treatment has been determined.

16. A method of controlling a motorized window treatment driven by an electronic drive unit having a motor, a controller, and a memory, the controller operable to determine the rotational position of the motor, the memory having a plurality of memory locations, the method comprising the steps of:
adjusting a present position of the motorized window treatment in response to the rotational position of the motor;
storing the value of the present position of the motorized window treatment in one of the memory locations of the memory each time the rotational position of the motor changes by a predetermined angle, such that a plurality of position values are stored in the memory in sequential order;
locating a discontinuity in the plurality of position values; and
determining the present position of the motorized window treatment in response to locating the discontinuity in the plurality of position values.

17. The method of claim 16, wherein the memory locations in which the plurality of position values are stored are in sequential order.

18. The method of claim 17, wherein the plurality of position values provide a record of the movement of the motorized window treatment.

19. A method of controlling a motorized window treatment to a desired position, the motorized window treatment driven by an electronic drive unit having a motor, a controller, and a memory, the controller operable to determine the rotational position of the motor, the method comprising the steps of:
adjusting a present position of the motorized window treatment in response to the rotational position of the motor;

storing the desired position in the memory;

storing the present position of the motorized window treatment in the memory each time the rotational position of the motor has changed by a predetermined angle, such that a plurality of positions are stored in the memory;

recalling the desired position from the memory when the controller is reset;

examining the plurality of positions stored in the memory to locate a discontinuity in the plurality of positions; and determining the present position of the motorized window treatment in response to locating the discontinuity in the plurality of positions; and automatically driving the motor in response to the desired position and the present position after the desired position has been recalled from the memory and the present position of the motorized window treatment has beed determined.

* * * * *